United States Patent [19]

Head et al.

[11] 4,381,902
[45] May 3, 1983

[54] HELICOPTER TAIL ROTOR OF THE ELASTOMERICALLY-MOUNTED COMPOSITE FLEXBEAM TYPE

[75] Inventors: Robert E. Head, Palos Verdes Estates; Debashis Banerjee, Sepulveda, both of Calif.

[73] Assignee: Hughes Helicopters, Inc., Culver City, Calif.

[21] Appl. No.: 105,545

[22] Filed: Dec. 20, 1979

[51] Int. Cl.³ ............................................. B64C 27/38
[52] U.S. Cl. .................................. 416/134 A; 416/41; 416/500
[58] Field of Search .................. 416/134 A, 141, 138, 416/500

[56] References Cited

U.S. PATENT DOCUMENTS

| | | | |
|---|---|---|---|
| 3,874,815 | 4/1975 | Baskin | 416/141 X |
| 3,880,551 | 4/1975 | Kisovec | 416/138 A |
| 3,902,944 | 9/1975 | Ashton et al. | 156/156 |
| 3,962,506 | 6/1976 | Dunahoo | 428/158 |
| 3,999,887 | 12/1976 | McGuire | 416/134 A |
| 4,008,980 | 2/1977 | Noehren et al. | 416/134 A |
| 4,047,839 | 9/1977 | Ferris et al. | 416/226 X |
| 4,053,258 | 10/1977 | Mouille | 416/134 A |
| 4,093,400 | 6/1978 | Rybicki | 416/134 A X |
| 4,095,322 | 6/1978 | Scarpati et al. | 29/156.8 P |
| 4,104,003 | 8/1978 | Mouille | 416/141 |
| 4,222,709 | 9/1980 | Mouille | 416/134 A |
| 4,244,677 | 1/1981 | Noehren et al. | 416/134 A |

FOREIGN PATENT DOCUMENTS 2921421 12/1979 Fed. Rep. of Germany ... 416/134 A

Primary Examiner—Everette A. Powell, Jr.
Attorney, Agent, or Firm—Beehler, Pavitt, Siegemund, Jagger & Martella

[57] ABSTRACT

A fiberglass-epoxy flexbeam extends from tip to tip of each opposed blade pair, carrying the blade centrifugal forces so that none of the centrifugal loading is carried by the hub. The primary load-carrying connector between the flexbeam and the hub is a set of elastomeric pads. These provide a soft mount between the flexbeam and the hub to keep the primary bending moments within the flexbeams where the filaments are designed to accommodate them. The elastomeric pads are also effective in isolating the hub from chordwise loads which include the steady driving torque and the "C" mode and "S" modes of coriolis vibration. The elastomeric hub mount damps these vibrations and tunes their frequencies to values well separated from the rotor frequency.

14 Claims, 15 Drawing Figures

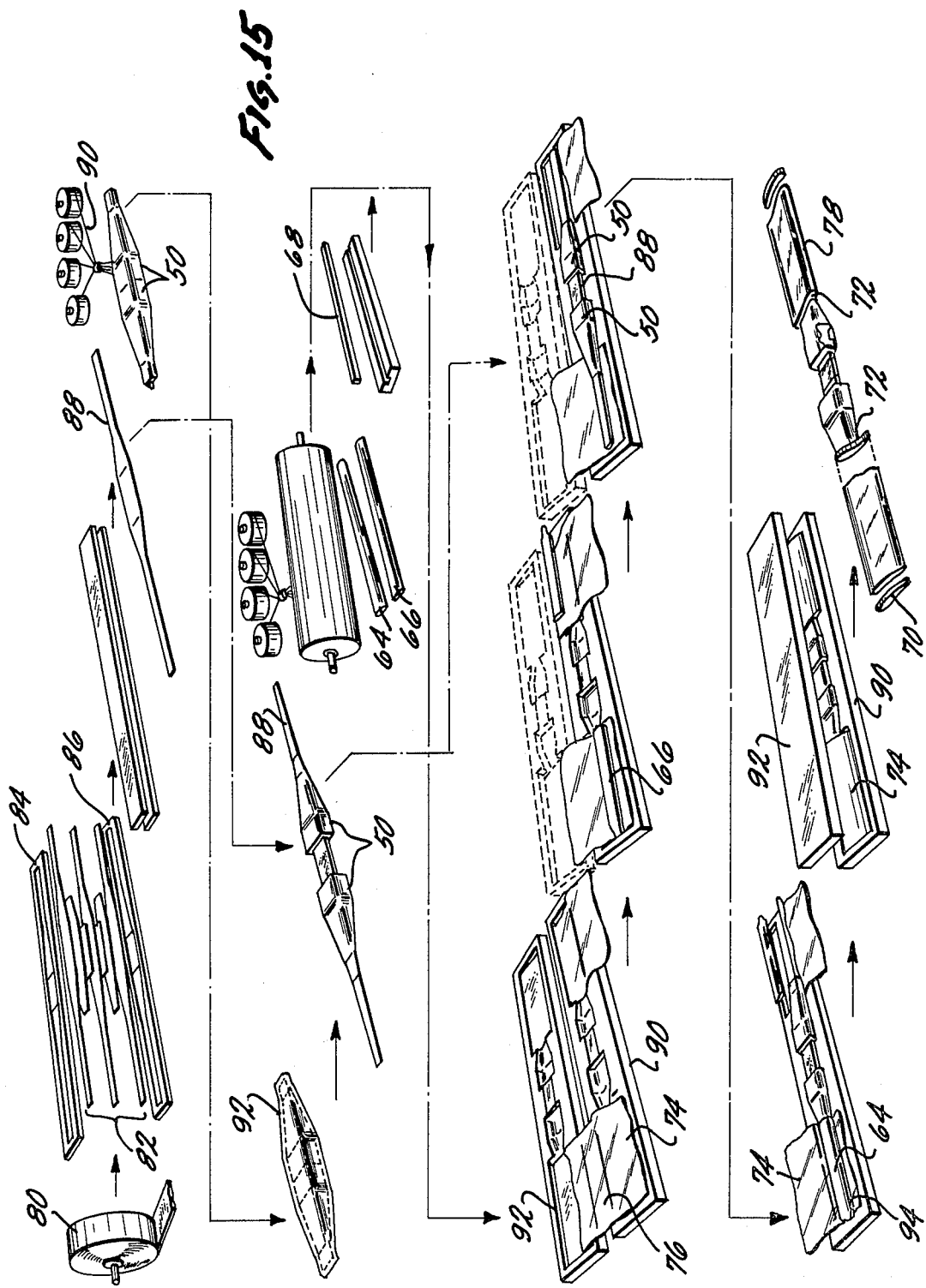

HELICOPTER TAIL ROTOR OF THE ELASTOMERICALLY-MOUNTED COMPOSITE FLEXBEAM TYPE

BACKGROUND OF THE INVENTION

1. Field of the Invention

The present invention is in the field of helicopters, and more specifically relates to a structure for the tail rotor of a helicopter.

2. The Prior Art

The blades of the helicopter tail rotor are normally connected to the tail rotor shaft in such a manner as to accommodate several degrees of freedom of motion of the rotor blade. These types of motion include: pitch, by which the angle of attack of the blade is changed; flap, the component of the motion of the blade tips parallel to the tail rotor shaft axis; and lead-lag, the motion of the blades in the plane of the rotor with respect to the rotor shaft.

These motions were accommodated in earlier helicopters through the provision of hinges. The use of hinges increased the mechanical complexity of the rotor structure, imposed lubrication requirements, and was not as efficient on a strength-to-weight basis as subsequently-developed techniques. Typically, four individual blades were separately attached to the tail rotor through the hinges, and thus, the centrifugal loads were borne by the rotor hub and the hinge mechanisms. Alternatively, for small helicopters, blade-pair assemblies were attached to the hub by pivot bearings, thus containing the centrifugal loads within the blade-pair assembly, but still requiring bearings at the hinge points.

The development of anisotropic composite structural elements including those in which high-strength fibers are embedded in an epoxy matrix, has enabled development of hingeless rotors. Typically in such a rotor, the diametrically opposed blades are connected by an uninterrupted beam of composite material having its fibers extending radially to withstand the centrifugal forces and to provide low feathering stiffness. Typically, the beam is relatively thin in the direction of the rotor shaft and relatively broad in the chordwise direction. This cross-sectional shape facilitates flapping of the blades while permitting the driving torque to be transmitted to the blades, and blade pitch control is effected by elastically twisting the beam. Because the motions of the blades are accommodated by elastic flexing of the beam, the beam is usually referred to as a flexbeam. In some rotors, the flexbeam extends radially only a relatively short distance, and the aerodynamic portion of the blade is attached to the end of the flexbeam.

Because the flexbeam is rigidly affixed to the rotor hub, twisting of the flexbeam for pitch control requires the application of the twist-producing force at a location spaced radially outward from the hub, and spaced forward or aft of the blade's twist axis in the chordwise direction. Typically, the force is transmitted through a control push rod, the end of which is pivotally connected to a pitch horn affixed to a torsionally-stiff pitch case (torque tube) which surrounds the flexbeam but is spaced from it and which extends radially outwardly to the aerodynamic portion of the blade to which is it attached and to which it can transmit torque. With regard to flapping motion, the flexbeam may be though of as possessing an effective flapping hinge about which the flapping motion of the blade is centered. Normally, the pitch horn is located radially outwardly of the effective flapping hinge on the leading edge side of the blade, so that when the blade flaps upwardly, the blade pitch angle decreases (see FIG. 11). Alternatively, the same effect may be had by locating the pitch horn radially inboard of the effective flapping hinge on the trailing edge side of the blade. Either of these locations of the pitch horn results in reduced blade thrust and strap stresses with controlled flapping motion of the rotor blade. The magnitude of the angle $\delta_3$ is indicative of the amount of pitch-flap coupling, where $\delta_3$ is the complement of the angle between the radial direction and the line through the effective flapping hinge and the point on the pitch horn at which the pitch control forces are applied.

The advantages of hingeless rotors are not obtained without introducing other complications, including the potential for aeroelastic instabilities peculiar to the hingeless rotors. These instabilities were identified in the early 1970's, and various solutions were tried, as will be described below.

For example, in U.S. Pat. No. 3,999,886 issued Dec. 28, 1976 to Ormiston et al., it was disclosed that the stability can be improved by inclining the principal elastic flexural axes and by including an arrangement for varying the pitch of the blade in relation to the degree of bending of the blade in a plane parallel to the plane of rotation of the blade, i.e., for providing pitch-lag coupling. In one embodiment, the pitch-lag coupling is provided by arranging the parts in such a manner that the torque tube forces the blade shank to twist in response to bending of the blade shank in a direction parallel to the plane of rotation. In another embodiment, pitch-lag coupling is produced by proper positioning of the pitch link to force the blade shank to twist when lead-lag bending of the blade shank occurs.

In the helicopter rotor disclosed by Ormiston et al., the centrifugal forces of the opposed blade halves are applied to the hub, which requires that the hub be sufficiently strong to withstand these stresses. It is not possible to join the opposed blades by a single flexbeam extending through the hub because of the anisoelastic structure of the flexbeam disclosed. In that structure, strips of high stiffness and of low stiffness are combined so that the principal elastic axes are inclined to the geometric axes of the cross section of the flexbeam. If a beam of this structure extended on both sides of the rotor, the principal elastic axes would be correctly aligned on one side of the hub, but would be incorrectly aligned on the opposite side of the hub. This prevents the flexbeam from extending through the hub and accordingly requires that the centrifugal stresses be borne by the hub.

The advantages of extending the flexbeam through the hub were recognized by workers at United Technology Corporation in Hartford, Conn., and their discoveries are disclosed in the following publications: U.S. Pat. No. 4,047,839 issued Sept. 13, 1977 to Ferris et al.; the technical paper "Composite Bearingless Tail Rotor for UTTAS" by Fenaughty and Noehren, presented by the 32nd Annual National Forum of the American Helicopter Society, May, 1976; the technical paper "Aeroelastic Characteristics of Composite Bearingless Rotor Blades" by Richard L. Bielawa, presented at the 32nd Annual National V/SPOL Forum of the American Helicopter Society, Washington, D.C., May, 1976; and U.S. Pat. No. 4,087,203, issued May 2, 1978 to Ferris.

Broadly, these references disclose a helicopter rotor having opposed blades interconnected by a common flexible spar which passes across the rotor axis and is connected to the drive shaft by clamped hub plates, as shown in FIG. 1 herein. A spanwise-extending torque tube having a pitch horn at its radially inner end forms a rigid connection with the spar and blade at the radially outwardly end of the torque tube.

In the United Technology Corporation's approach, the flexbeam was tapered but was relatively thick at the hub, and was bolted rigidly to the hub as best seen in FIG. 3 of U.S. Pat. No. 4,047,839. This construction caused loads to be transmitted through the hub which had a tendency to crack as a result. As described in U.S. Pat. No. 4,087,203, an elastomeric snubber was used to center the pitch case with respect to the flexbeam because of control considerations. The snubber induced a large flap bending moment, and this had a tendency to crack the relatively thick rib that was provided at the radially inward end of the blade where the pitch case and flexbeam joined the blade. As will be seen below, the structure of the present invention permits these disadvantages to be avoided.

Still another approach to the design of a bearingless tail rotor is disclosed in the technical paper "The YUH-61A Tail Rotor: Development of a Stiff Inplane Bearingless Flexstrap Design", by John Shaw, Jr. and W. Thomas Edwards of the Boeing Vertol Company, presented at the 33rd Annual National Forum of the Helicopter Society, Washington, D.C., May, 1977. As illustrated in FIG. 2 herein, a relatively thin, untapered flexbeam is used. The flexbeam is attached to the hub by torsionally-soft "cross-flexures", the purpose of which is to eliminate clamping of the flexstrap by the hub. The blade is bolted to the flexbeam, and this requires reinforcing the ends of the flexbeam. To avoid large flapping angles and corresponding flexbeam stresses, a large $\delta_3$ angle of $-65°$ is used. Consistent with standard nomenclature, a negative value of $\delta_3$ indicates "down" pitch for "up" flap. This effectively induces a positive pitch-lag kinematic coupling (with the pitch links inclined from the vertical between the swash plate and pitch horn) which has an adverse flap-lag instability, as described in the above paper. To cure this instability, the blades had to be swept back. Also, this design requires a relatively large motion of the pitch link.

Thus, it is seen that although the technology of flexbeam rotor design was relatively advanced at the time of the present invention, nevertheless, a number of problems were inherent in the approaches then used, and it is an object of the present invention to overcome these problems.

SUMMARY OF THE INVENTION

In the present invention a fiberglass-epoxy flexbeam extends from tip to tip of each opposed blade pair, carrying the blade centrifugal forces from blade to blade so that none of the centrifugal loading is carried by the hub. The flexbeam is tapered in thickness and in planform to minimize bending stresses and torsional stiffness. Further, the flexbeam is formed as a flat beam that operates in the untwisted condition when the blade is producing design lift, so that torsion stresses within the flexbeam are minimized. FIG. 3 shows a preferred embodiment.

In accordance with a preferred embodiment of the present invention, the primary load-carrying connection between the flexbeam and the hub is a set of elastomeric pads. These provide a soft mount between the flexbeam and the hub, to keep the primary bending moments within the flexbeam where the filaments are designed to accommodate them. The use of elastomeric pads minimizes restraint of the flexbeam and permits the flexbeam to bend for loading relief. In the flapwise sense, the elastomeric pads act essentially as pin joints to permit the beam to bend with minimal restraint by the hub. The elastomeric pads are clamped tightly between portions of the hub to pre-load the pads and to assure that they always have a pad compression load. All flap-bending loads are transferred between the flexbeam and the hub through compression in the elastomeric pads.

The elastomeric pads are also effective in isolating the hub from chordwise loads. Three predominant chordwise loads are encountered. The first is the steady driving torque. The other two chordwise loads result from coriolis acceleration of the blades. As is known in the art, the coriolis loads tend to bend the flexbeam in two modes (FIGS. 13 and 14): the "C" mode, and the "S" mode. With regard to the "C" mode, the shear softness of the elastomeric mount allows the flexbeam to bend without substantial restraint by the hub. All the chordwise bending moments remain in the flexbeam where they are accommodated by the filaments. In the "S" mode, the loads are taken in shear through the elastomeric pads and through short load paths across the rugged corners of the hub.

The elastomeric hub mount is, dynamically, a unique design. It locates the "S" mode natural frequency below 1/rev (once every revolution of the rotor) which is far separated from the 2/rev (twice every revolution) coriolis loads and from coalescence with the first flap frequency. In addition, with the high damping of the damping pads, the dynamic coriolis loads in the "S" mode (2/rev) are made negligible. Since the "S" mode is a reactionless mode, it does not create the well known "ground resonance" problems with its natural frequency below 1/rev. The "C" mode natural frequency at approximately 2/rev is well separated from the first flap frequency and 1/rev coriolis loads. These optimal dynamic features, feasible with this design, are marked improvements over previously designed flexbeam tail rotor concepts.

An elastomeric snubber is included between the pitch case and the flexbeam to center the pitch case with respect to the flexbeam. The elastomeric snubber is soft in torsion and in-plane shear, but is stiff with respect to vertical loading. In an alternative embodiment, the elastomeric snubber may be replaced by an anti-friction bearing that permits rotational freedom in the blade feathering sense, and lateral freedom.

In accordance with a preferred embodiment of the invention, the elastomeric snubber is located outboard beyond the region of maximum flap bending curvature of the flexbeam. This minimizes the rotational deflection of the pitch case relative to the flexbeam and thereby minimizes snubber-induced bending moment at the junction of the pitch case with the blade. See FIGS. 10 and 12.

In accordance with a preferred embodiment of the invention, a moderate value of $\delta_3$, no more than $-35°$, is employed for a preferred balance of natural frequency placements, blade loads, and good stability. See FIGS. 10 and 11.

The pitch case is a wet-filament wound fiberglass-epoxy hollow structure that fits around and is bonded to the flexbeam. In a preferred embodiment, the filaments are placed in a ±45 degree orientation to maximize torsional stiffness while minimizing bending stiffness and maintaining adequate strength. Inboard of the blade root, the pitch case enlarges to give the flexbeam room in which to twist as the blade changes pitch. A feature of wet-filament winding is that as the perimeter of the pitch case decreases, towards the junction of the pitch case the the root of the blade, the wall thickness increases to maintain essentially constant wall cross-sectional area. The taper in the pitch case (at this junction) towards the neutral axis reduces its structural stiffness as desired to minimze stress concentration at the pitch case-blade root junction.

In accordance with the present invention, each blade pair of the rotor is fabricated by positioning the flexbeam, the pitch cases, and the components making up the blades within a two-piece, full-cavity mold which is heated to cure the resin, so that the major components are co-cured together to form an integral composite structure. Thereafter, the pairs of blades are assembled into the hub. A preferred embodiment of the fabrication process is shown in FIG. 15.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 15 is a flow diagram illustrating the preferred process for fabricating the rotor blade of FIG. 3.

DETAILED DESCRIPTION OF THE PREFERRED EMBODIMENT

Figure 1:
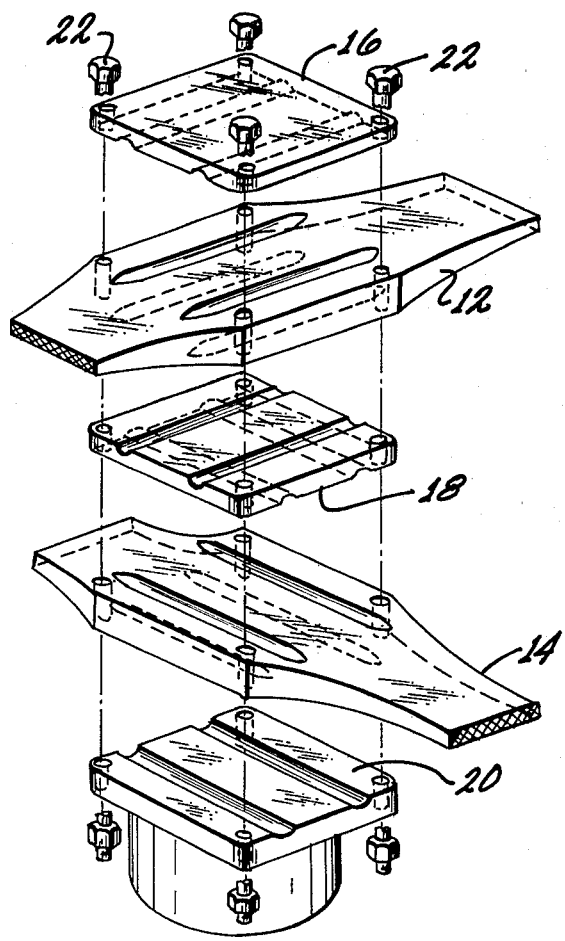
FIG. 1 is a perspective view of one type of rotor blade mounting known in the prior art.

FIG. 1 shows a flexbeam hub mounting system of a type known in the prior art as discussed above. Two pairs of opposed rotor blades are used, and the opposed blades are interconnected by the flexbeams 12, 14. These flexbeams are bolted to the hub as shown in FIG. 1. The flexbeam 14 is clamped between the hub plates 18, 20, while the flexbeam 12 is clamped between the hub plates 16, 18 when the bolts 22 are tightened.

As pointed out above, this construction causes loads experienced by the flexbeam 12, 14 to be transmitted directly to the hub plates 12 and 20 rather than being carried by the spanwise extending fibers of the flexbeams.

Figure 2:
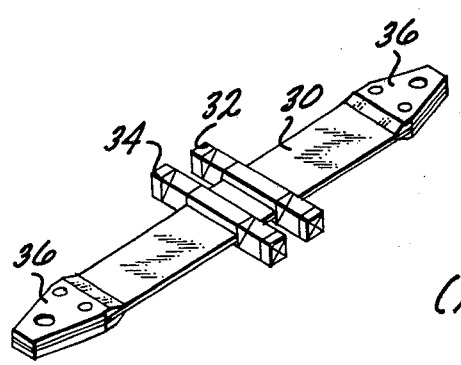
FIG. 2 is a perspective view of another type of flexbeam known in the prior art.

FIG. 2 also shows a type of flexbeam hub-mounting known in the prior art and also described above. The hub-mounting system of FIG. 2 provides a more flexible attachment of the flexbeam to the hub, thereby reducing the stresses on the hub assembly and permitting more effective use of the spanwise load-bearing capability of the flexbeam. In the approach shown in FIG. 2, the flexbeam 30 is attached to the hub by torsionally-soft cross-flexures 32, 34. The opposed rotor blades are bolted to the ends 36 of the flexbeam. However, to avoid large flapping angles and corresponding flexbeam stresses, a large $\delta_3$ angle had to be used. This in turn resulted in adverse flap-lag instability and also required a relatively large motion of the pitch link. Although the structure of FIG. 2 provides for flap flexibility, it provides negligible lead-lag damping. It also lacks lead-lag flexibility, and to this extent additional stresses are imposed on the hub assembly.

Figure 3:
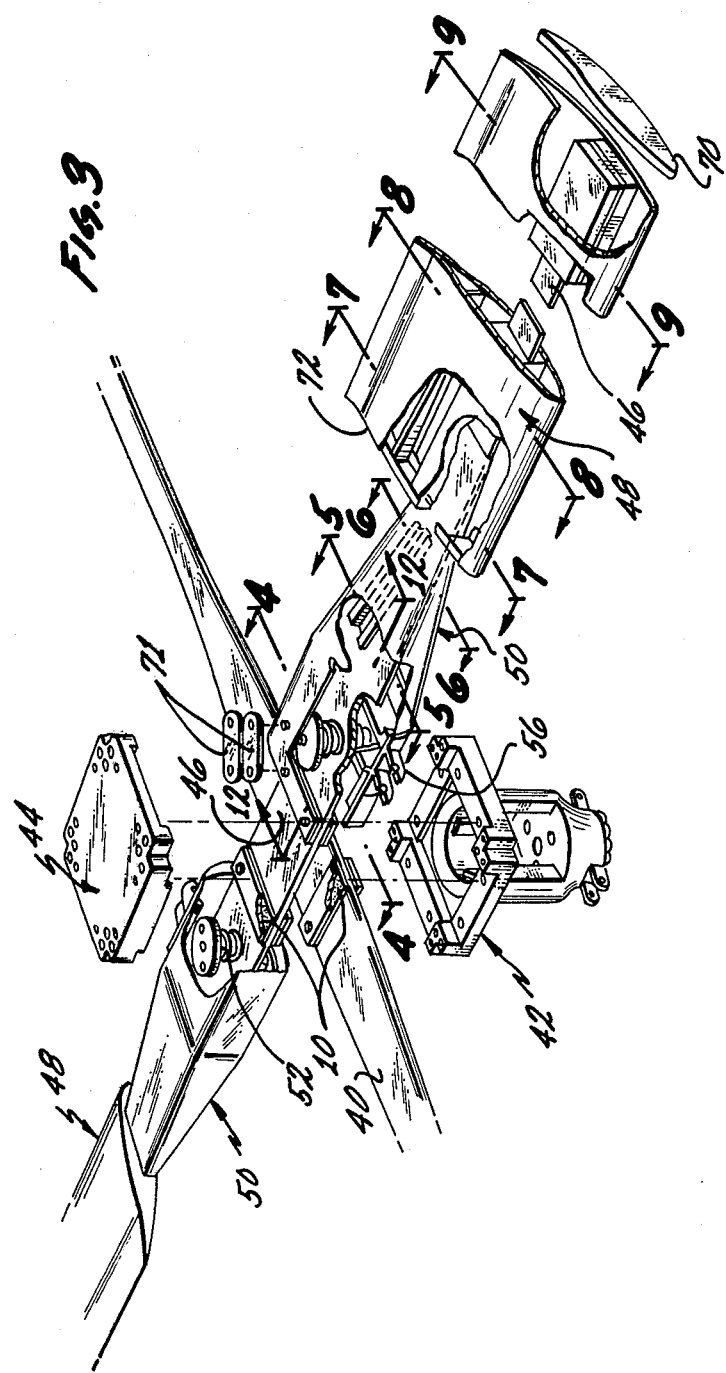
FIG. 3 is a perspective view of the flexbeam tail rotor in a preferred embodiment of the present invention.

The preferred embodiment of the present invention, shown in FIG. 3, overcomes the problem experienced with the prior art hub mounting systems by interposing elastomeric pads 10 between the flexbeam 40 and the hub cover 44, between the flexbeam 40 and the hub body 42, between the flexbeam 46 and the hub body 42, and between the flexbeam 46 and the hub cover 44, as shown in FIG. 3. These elastomeric pads 10 provide a soft mount between the flexbeams 40, 46, and the hub, thereby minimizing restraint of the flexbeam and permitting it to bend in the region of the hub to accommodate the primary bending moment experienced by the flexbeams 40, 46. With regard to flap motions of the flexbeams, the elastomeric pads 10 act essentially as pin joints to permit the beam to bend with minimal restraint. The elastomeric pads 10 are clamped tightly between the hub body 42 and the hub cover 44 to preload the elastomeric pads so that they always have a compression load.

Figure 13:
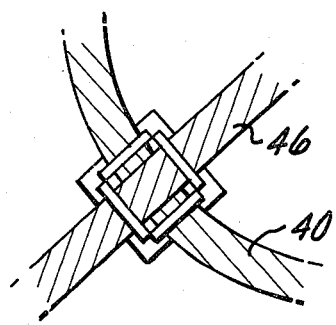
FIG. 13 is a diagram illustrating "C" mode inplane flexbeam bending.
Figure 14:
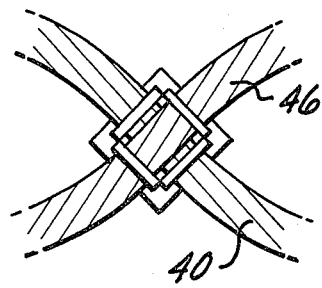
FIG. 14 is a diagram illustrating "S" mode inplane flexbeam bending.

Because of their softness, the elastomeric pads 10 also permit bending of the flexbeam 40, 46 to accommodate chordwise loads. As discussed above, the loads include the steady driving torque as well as two coriolis loads which tend to bend the flexbeams 42, 46 into the shapes shown in FIGS. 13 and 14, respectively. The shear softness of the elastomeric pads 10 permit the flexbeams 40, 46 to bend in the "C" mode shown in FIG. 13 without substantial restraint by the hub. All of the chordwise bending moments remain in the flexbeam where they are accommodated by the spanwise-extending filaments. In the "S" mode shown in FIG. 14, the loads are taken in shear through the elastomeric pads 10 and through short load paths across the rugged corners of the hub.

In addition to providing isolation of the hub from bending moments experienced by the flexbeams 40, 46, the elastomeric pads 10 also provide dynamic damping between the flexbeams and the hub to attenuate the transmittion of vibrations from the flexbeams to the hub and further serve to damp the vibration of the flexbeams 40, 46 in both the "C" and the "S" modes of vibration. In a preferred embodiment of the present invention, the damping supplied by the elastomeric pads 10 is chosen so as to pre-tune the "C" and "S" frequencies of vibration so as to separate the vibrational frequencies from the rotor rotational frequency.

As shown in FIG. 3, the flexbeams 40, 46 extend from tip to tip in each opposed blade pair, so as to carry the blade centrifugal forces, so that none of the centrifugal forces are carried by the hub. In a preferred embodiment of the invention, the flexbeams 40, 46 are composed of a fiberglass-epoxy composite in which the fibers extend spanwise from the hub to the blade tips. In a preferred embodiment, the flexbeam is tapered both in thickness and in planform to minimize the bending stresses and torsional stiffness, as may also be seen in FIGS. 4–9, 12, and 15. The aerodynamic blades 48 are attached at an angle to the flexbeam so that the flexbeam operates in the untwisted condition when the blade is producing design lift, to minimize torsion stresses within the flexbeam.

Pitch cases 50 surround the inboard portion of the flexbeams 40, 46 to permit control torques to be applied to the blades 48 by control push rods 54 (shown in FIG. 11) to vary the pitch of the blades 48. The push rods 54 are pivotally attached to the pitch horn 56 of the pitch cases 50. The inboard ends of the pitch cases 50 are open, and the pitch cases 50 are spaced from the flexbeams 40, 46.

Figure 4:
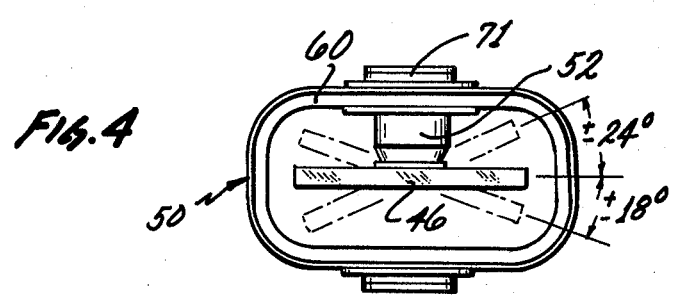
FIG. 4 is a side cross-sectional view in the direction 4—4 indicated in FIG. 3.
Figure 5:
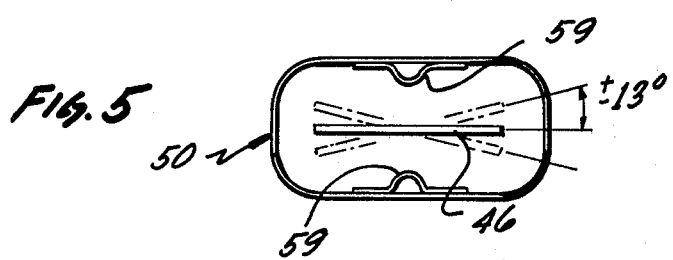
FIG. 5 is a side cross-sectional view in the direction 5—5 indicated in FIG. 3.
Figure 12:
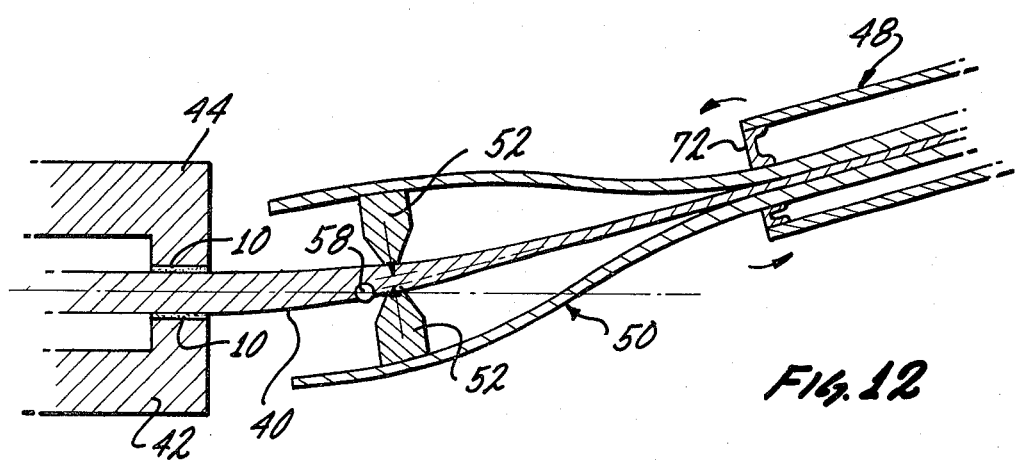
FIG. 12 is a cross-sectional view in the direction 12—12 indicated in FIG. 3.

A snubber 52 is included between each pitch case 50 and the flexbeam that the pitch case surrounds, as seen in FIGS. 3, 4 and 12. The snubbers 52 serve to center the pitch cases 50 with respect to the flexbeams. The snubbers 52 are soft in torsion and in-plane shear, but are stiff with respect to vertical loading.

In a preferred embodiment of the invention, the snubber 52 is located outboard beyond the region of maximum flap-bending curvature of the flexbeam. This minimizes the rotational deflection of the pitch case relative to the flexbeam and thereby minimizes snubber-induced bending moments at the junction of the pitch case with the blade.

In an alternative embodiment the pitch case is of such a size and shape that the snubber is not needed.

Figure 10:
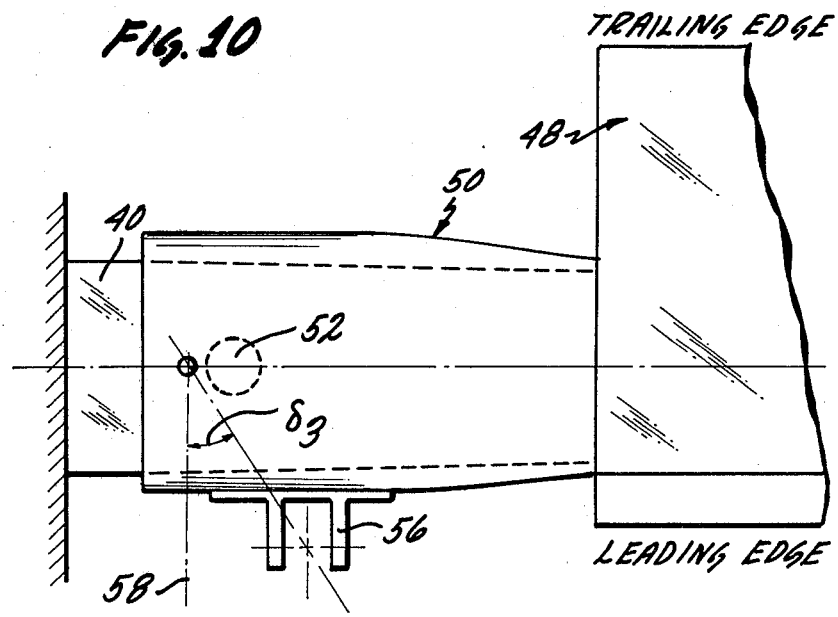
FIG. 10 is a fractional plan view of the preferred embodiment shown in FIG. 3.
Figure 11:
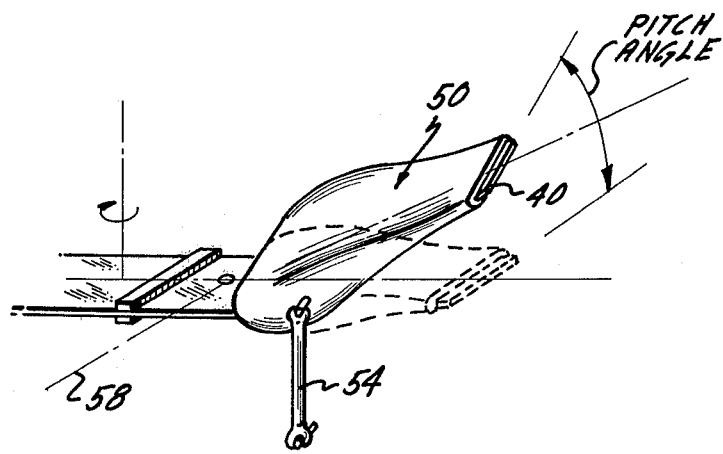
FIG. 11 is a diagram illustrating the concept of pitch-flap coupling.

Referring to FIGS. 10 and 11, the flexbeam may be thought of as possessing an imaginary effective flapping hinge line 58 about which the blade effectively pivots in flap. Normally, the pitch horn 56 is located radially outwardly of the effective flapping hinge 58. As shown in FIG. 11, if the pitch push rod 54 is not altered, and if a flapping motion is experienced by the blade 48, the stationary pitch push rod 54 will pull the leading edge of the blade downwardly, thereby inducing the desired pitching motion of the blades 48. The magnitude of this pitch-flap coupling clearly depends on the spanwise location of the pitch horn 56 with respect to the effective hinge line 58. Thus, the angle $\delta_3$ is indicative of the amount of pitch-flap coupling.

In the preferred embodiment of the invention, a moderate value of $\delta_3$, no more than $-35°$, is employed to achieve a preferred balance between natural frequency placement, blade loads, and good stability.

Figure 6:
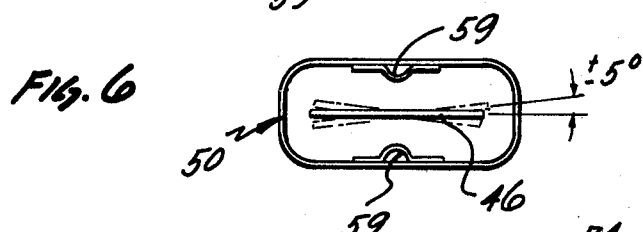
FIG. 6 is a side cross-sectional view in the direction 6—6 indicated in FIG. 3.

FIGS. 4–9 are cross-sectional views taken at successive spanwise positions in the direction shown in FIG. 3. In comparing FIGS. 4, 5 and 6, it is seen that the inside dimensions of the hollow pitch case 50 must be larger at the inboard end than at the outboard end to accommodate the greater rotational displacement of the pitch case with respect to the flexbeam 46. Because the pitch case has smaller cross-sectional dimensions at its outboard end, as shown in FIG. 6, the torsional stresses at the outboard end are proportionately greater. To accommodate the greater stresses, ideally the wall thickness of the pitch case should increase with increasing outboard distance.

This result is achieved in the preferred embodiment by forming the pitch case as wet-filament wound fiberglass epoxy hollow structure that is bonded to the flexbeam. A feature of wet-filament winding is that as the perimeter of the pitch case decreases, towards the junction of the pitch case 50 and the root of the blade 48, the wall thickness increases to maintain essentially constant total wall cross-sectional area. For optimum torsional stiffness and flapwise bending stiffness the filaments are oriented at an angle of $\pm 45$ degrees, in a preferred embodiment. Near the inboard end of the pitch case 50, two hoop-wound stiffening rings provide the strength required to support the loads applied by the pitch horn 56 and the snubber 52. The stiffening ring 60, located at the snubber 52, is visible in FIG. 4. Ribs 59, formed from uni-directional filaments, lie along the top and bottom center lines of the pitch case 50 to stabilize the non-circular pitch case for the torsion loads it must carry.

Figure 7:
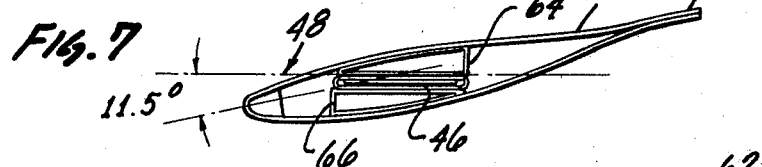
FIG. 7 is a side cross-sectional view in the direction 7—7 indicated in FIG. 3.
Figure 8:
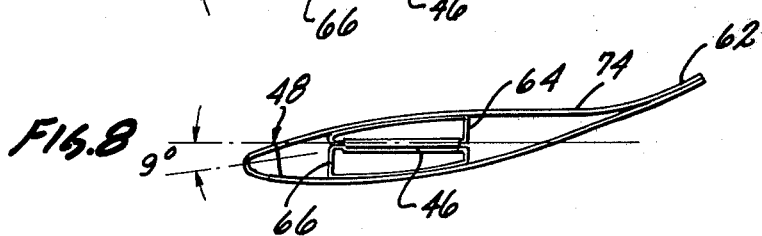
FIG. 8 is a side cross-sectional view in the direction 8—8 indicated in FIG. 3.
Figure 9:
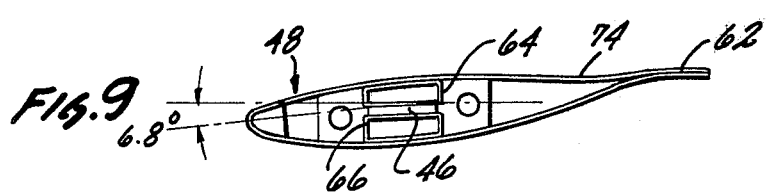
FIG. 9 is a side cross-sectional view in the direction 9—9 indicated in FIG. 3.

As may be seen by comparing FIGS. 7, 8 and 9, the blade 48 has a generally uniform cross section; however, it should be noted that the angle of the tab 62 with respect to the chord of the section may vary with the spanwise location of the section. This enables the tab 62 to counteract the blade section pitching moments so as to minimize control forces. Closer inspection of FIGS. 7, 8 and 9 reveals that the blade has a $-8°$ twist, and that the blade 48 is positioned about the flexbeam 46 so that when the flexbeam is flat and untwisted, the blade pitch angle at the three-quarters radius position is approximately 8 degrees.

As may be seen in FIG. 3, as well as in FIGS. 7, 8 and 9, the blade 48 is a multi-tubular composite structure that is bonded around the flexbeam as indicated in FIG. 15. That is, the spar tubes 64, 66 are located above and below the flexbeam 46, and a spar 68 in the leading edge of the blade achieves chordwise balance. In a preferred embodiment, the spar tubes 64, 66 and the leading edge spar 68 are composed of an aramid- or fiberglass-epoxy composite.

As shown in FIGS. 3 and 4, laminated metal weights 71 may be placed over the snubber attachment bolts and/or over the pitch link attachment bolts to balance the blade-pair assembly spanwise and chordwise. As shown in FIGS. 7, 8 and 9, the blade 48 further includes an outer skin 74 which is a preferred embodiment is a single piece of aramid- or fiberglass-epoxy skin that extends forward from the trailing edge along the underside of the blade 48, is folded around the nose of the blade, and then extends to the trailing edge of the blade. An electrothermal deicer blanket 76 extends around the nose of the blade, and is covered by a stainless steel-backed polyurethane erosion strip 78, in a preferred embodiment as shown in FIG. 15.

The process by which the flexbeam, pitch cases, and blades are formed as a single composite structure is shown in FIG. 15. The strips 82 that make up the flexbeam are cut from a roll 80 of unidirectional fiberglass tape, are coated with an epoxy, and are arranged in selected locations between the mold halves 84, 86. Next, the mold halves 84, 86 are brought together and the strips are cured together to form an intermediate product which is then trimmed to form the flexbeam 88.

On a mandrel of suitable shape, the pitch cases 50 are wet-filament wound in a back-to-back configuration shown in the upper right hand portion of FIG. 15. The wound intermediate is then vacuum-bagged and cured. Thereafter, the pitch cases 50 are separated from each other and from the mandrel and are assembled on finished flexbeam 88.

Next, the upper and lower spar tubes 64, 66 and the outer skin 74 are wet-filament wound, and the leading edge spar 68 is molded. At this point, all of the components that are to be co-cured in the final assembly have been made.

Next, the outer skin 74 and the electrothermal deicer blanket 76 are placed in the mold 90 and rubbed out. Then, the lower spar tubes 66 are inserted into the mold 90 at the proper positions. Thereafter the assembly consisting of the finished flexbeam 88 and the pitch cases 50 is inserted into the mold 90. Then, the upper spar tubes 64, the leading edge spars 68 and two or more dummy spar tubes 94 are inserted into the mold and the outer skin 74 is then folded over the parts of the mold 90, the mold half 92 is applied, and the materials between the mold halves 90, 92 are co-cured with all spar tubes pressurized. Thereafter, the composite structure is removed from the mold and trimmed, the pitch horns, damper pads, snubbers, erosion strips 78, root end caps 72, and tip end caps 70 are attached to the composite structure.

Thus, there has been described a composite flexbeam tail rotor for use on a helicopter which structure is formed by a process which permits the most advantageous use of the materials employed. Centrifugal loads are carried by a flexbeam which is formed of a fiberglass-resin composite in which the fibers extend spanwise of the flexbeam. The pitch cases and aerodynamic blades are co-cured in a single molding and the resulting structure combines strength with lightness.

The flexbeams are mounted to the rotor hub by elastomeric pads which permit the flexbeams to bend in flap and in lead-lag to accommodate various loads experienced by the flexbeam, and thereby to prevent these loads from being applied to the rotor hub. The elastomerical pads also are important in damping certain types of vibrations experienced by the blade and in tuning the frequencies of these vibrations to values well separated from the rotor exciting frequency.

The foregoing detailed description is illustrative of one embodiment of the invention, and it is to be understood that additional embodiments thereof will be obvious to those skilled in the art. The embodiments described herein, together with those additional embodiments, are considered to be within the scope of the invention.

What is claimed is:

1. In a helicopter rotor of the type in which a flexbeam interconnects blades on opposite sides of a hub and in which the flexbeam is attached to the hub, the improvement comprising:
chordwise damping and coupling means interposed between the flexbeam and the hub for isolating the hub from bending loads encountered by the flexbeam and for coupling said flexbeam to said hub while allowing chordwise movement of said blades and flexbeam,
whereby chordwise resonance frequencies are substantially eliminated.

2. The improvement of claim 1 wherein the hub further includes means for applying a chosen compressive force to said damping means to preload said damping means.

3. In a helicopter rotor of the type in which a flexbeam interconnects blades on opposite side of a hub and in which the flexbeam is attached to the hub, the improvement comprising:
damping means interposed between the flexbeam and the hub for pre-tuning the chordwise vibrational frequency of the flexbeam by allowing dampened, chordwise movement of said flexbeam.

4. The improvement of claim 3 wherein the hub further includes means for applying a chosen compressive force to said damping means to preload said damping means.

5. In a helicopter rotor of the type in which a flexbeam interconnects blades on opposite sides of a hub and in which the flexbeam is attached to the hub, the improvement comprising:
damping means interposed between the flexbeam and the hub for attenuating the transfer of chordwise vibrations between the flexbeam and the hub, yet permitting for said attenuated chordwise vibration of said flexbeam.

6. The improvement of claim 5 wherein the hub further includes means for applying a chosen compressive force to said damping means to preload said damping means.

7. In a helicopter rotor of the type in which a flexbeam interconnects blades on opposite sides of a hub and in which the flexbeam is attached to the hub by clamping the flexbeam between a first hub plate and a second hub plate, the improvement comprising:
a damping pad disposed in a horizontal plane included between the flexbeam and the first hub plate for allowing dampened chordwise vibration of said flexbeam and blades, said chordwise vibration being damped at all rotor speeds below one per revolution.

8. The improvement of claim 7 wherein said damping pad is sufficiently soft to isolate the hub from bending loads encountered by the flexbeam.

9. The improvement of claim 8 wherein said damping pad is sufficiently soft in directions parallel to said first hub plate as to isolate the hub from flap loads encountered by the flexbeam.

10. The improvement of claim 8 wherein said damping pad is sufficiently soft in a direction perpendicular to said first hub plate as to isolate the hub from lead-lag loads encountered by the flexbeam.

11. The improvement of claim 7 wherein said damping pad has a predetermined stiffness to pre-tune the chordwise vibrational frequency of the flexbeam.

12. The improvement of claim 7 further comprising means for applying a predetermined force to compress said damping pad between the first hub plate and the second hub plate.

13. The improvement of claim 7 wherein said damping pad is a unitary structure composed of an elastomeric substance.

14. The improvement of claim 7 further comprising: another damping pad included between the flexbeam and the second hub plate.

* * * * *